3,044,979
SILICONE-POLYESTER COMPOSITIONS AND PROCESS FOR PREPARING SAME
John E. Saville, Schenectady, N.Y., assignor to General Electric Company, a corporation of New York
No Drawing. Filed June 18, 1959, Ser. No. 821,121
17 Claims. (Cl. 260—45.4)

This invention relates to silicone-polyester copolymer compositions. More particularly, it relates to heat-curable silicone-polyester copolymers which are characterized by excellent heat resistance as well as other desirable physical characteristics and which are particularly useful in coating applications. This application is a continuation-in-part of my copending application Serial No. 630,475, filed December 26, 1956, now abandoned.

The use of silicones for heat resisting coating compositions is well known. Generally, in addition to their heat resistant qualities, such compositions have a good gloss, good impact strength, and suitable light resistance. However, they leave much to be desired in the way of hardness, adhesion and mar or abrasion resistance because of their relative softness. Additionally, they have a relatively long cure cycle which is typically over 60 minutes at temperatures of over 450° F. In an attempt to overcome the deficiencies of straight silicone-base coating materials, silicones have been combined mechanically or without chemical reaction with polyesters to obtain the heat resistance of the silicone along with good adhering qualities, hardness, quick cure, and mar and abrasion resistance of the polyester. However, it has generally been found that the silicone or organopolysiloxane and polyester were incompatible when used for coating purposes, and did not retain the heat resistance characteristic of the silicone alone. Even when the silicone and usual polyester are heated together to produce copolymerization, the resulting products are generally deficient in heat resistance which is required in high-temperature insulation, as well as protective coating compositions for apparatus subjected to heat, such as heaters, ovens, furnaces, incinerators, ranges, aircraft parts, and other similar equipment.

According to copending application of Modic and Saville, S.N. 630,474, filed December 26, 1956, now abandoned, and assigned to the same assignee as this invention, there are prepared desirable silicone-polyester compositions in which (1) suitably hydrolyzed silanes are copolymerized with (2) a hydroxyl-rich polyester produced by the reaction of, by weight, (a) from 25 to 60 equivalent percent of a lower dialkyl ester of a member selected from the group consisting of isophthalic acid, terephthalic acid, and mixtures of such members, (b) from 10 to 50 equivalent percent of ethylene glycol, and (c) from 20 to 60 equivalent percent of a saturated aliphatic polyhydric alcohol having at least three hydroxyl groups.

The alkyl silanes useful in conjunction with the invention of the above application are those in which the alkyl groups attached to the silicon atom are methyl or ethyl or mixtures thereof, and in which the hydrolyzable component is preferably a halogen, the hydrolyzable groups numbering from 1 to 3. The aryl silanes preferred are those in which the aryl group is phenyl or halophenyl, with again the hydrolyzable groups being preferably halogen and numbering from 1 to 3. Alkyl aryl silanes are also useful. It is well known that the lower alkyl groups and the phenyl group impart greater heat stability to silicone materials; hence the preference for these materials. However, up to 25 percent of material containing other than methyl, ethyl and phenyl groups or derivatives thereof can be tolerated without serious loss of heat resistance, including alkyl groups containing from 2 to 5 or more carbon atoms. While for best results and low cost the hydrolyzable group is preferably a halogen, other hydrolyzable groups such as alkoxy, amino, aryloxy and acyloxy can be used. While the preferred silicon-bonded (i.e., attached to silicon by C—Si linkages) methyl and phenyl groups can be present in any proportion, it is preferred to have from about 40 to 60 percent methyl groups with the rest phenyl, the exact proportion depending upon the particular properties desired in the final product. While both methyl and phenyl groups are superior in heat resistance, an excessive amount of methyl groups tends toward a brittle product while an excess of phenyl groups causes too much thermoplasticity. The prescribed proportions result in an end product which has the most desirable combination of physical properties. The ratio of organic groups to silicon atoms may range from 1.0 to 1.75, and most preferably from 1.0 to 1.55.

The organosilanes according to the above application can be hydrolyzed in any of the usual manners, as for example by means of a suitably catalyzed solution or in water alone. While such usual methods of hydrolysis in which the organosilanes are often dissolved in a solvent such as an alcohol, such as methyl, ethyl, propyl or butyl alcohol, a hydrocarbon solvent such as benzene, toluene, xylene, etc., in ether such as diethyl dibutyl ether, etc., or in various ketones such as acetone, methylethyl ketone, diethyl ketone and the like, are useful where the hydrolyzed product is to be used as such, when it is to be later copolymerized with a polyester, the incompatibility of the polyester with such solvents complicates the copolymerization of the silicone material and polyester. It is therefore preferred to carry out the hydrolysis of the organosilanes in the presence of an organic solvent which is immiscible with water and which acts as a solvent for the polyester, which is later to be reacted with the hydrolyzed material. Such solvents include the aliphatic esters of which butyl acetates, propyl acetates, amyl acetates, hexyl acetates, and the various propionates and butyrates are exemplary. In order to prevent ester interchange, an alcohol having the same organic radical as the alcohol residue of the ester is mixed in smaller amounts with the ester. In this process, described more fully in U.S. Patent 2,687,399 issued August 24, 1954, the proportions of organosilane, ester alcohol, and water can be varied widely. In general, it is only required that water be available in such amounts that the hydrolysis be carried out and to dissolve any hydrogen halide. The quantity of ester used ranges from about 10 percent to 60 percent, by weight, of the silanes used, while the alcohol, if present in an amount equal to about 10 percent by weight of the ester, serves the purpose of preventing cross esterification.

The hydrolysis process is carried to the point where a maximum number of OH groups is formed without causing condensation or gelling, or to the point where a homogeneous, clear, compatible copolymer is obtained when the hydrolyzed silanes are reacted with the polyester. Preferably, the reaction is carried out at a temperature under 40° C., although temperatures up to about 70° C.

are permissible. At temperatures of over 70° C., an inferior product results.

The polyesters to be combined with the silicone are generally disclosed in copending Precopio and Fox application, Serial No. 474,624, filed December 10, 1954, now Patent No. 2,936,296, and assigned to the same assignee as this application. In making the polyester, the lower dialkyl ester is used in amounts ranging from 25 to 60 equivalent percent, and preferably from 25 to 53 equivalent percent, the ethylene glycol in amounts of from 10 to 50 equivalent percent, and preferably from 15 to 42 equivalent percent, and the saturated aliphatic polyhydric alcohol from 20 to 60 equivalent percent and preferably from 28 to 50 equivalent percent. The preferred specific polyester composition comprises the reaction product of 32 equivalent percent lower dialkyl ester, 20 equivalent percent ethylene glycol, and the saturated aliphatic polyhydric alcohol 48 equivalent percent.

Among the lower dialkyl esters of the isophthalic and terephthalic acid which are useful are those in which the alkyl radicals have from 1 to 8, and preferably from 1 to 4, carbon atoms, including, for example, the dimethyl ester, the diethyl ester, the dipropyl ester, the dibutyl ester, etc.

The terms "polyhydric alcohol" and "saturated aliphatic polyhydric alcohol having at least three hydroxyl groups" include polyhydric alcohols in which the hydroxyls are connected by a plurality of carbon-to-carbon linkages as well as ether alcohols having more than three hydroxyl groups. Among the saturated aliphatic polyhydric alcohols having at least three hydroxyl groups and which are useful in connection with this invention are included, for example, glycerine, 1,1,1-trimethylol methane, 1,1,1-trimethylol propane, pentaerythritol, sorbitol, mannitol, diglycerol, dipentaerythritol, and the like.

The term "equivalent percent" as used in connection with the above refers to the total number of equivalents of a particular reactant material concerned, divided by the total number of equivalents of all reactants used in making the polyester, the reactants reacting equivalent for equivalent rather than mol for mol. For example, the equivalents of dimethylterephthalic in a given quantity is the number of mols times 2. Likewise, the number of equivalents of glycerine is the number of mols times 3, etc.

The synthetic polyester resins employed above are formed in conventional ways. Thus, the lower dialkyl ester of terephthalic acid or isophthalic acid, the ethylene glycol, and the higher polyhydric alcohol are merely added to any suitable reaction vessel formed of any material such as glass, stainless steel, or any of the other metals commonly employed in processing such resins. Since the reaction involved in forming the polyester, for instance, is essentially an alcoholysis reaction, the net effect of the reaction is to substitute a polyhydric alcohol or a glycol for the lower alkyl radicals of the lower dialkyl isophthalates or terephthalates with the concurrent liberation of the lower alcohol. In the case of the dimethyl esters of the acids, the alcohol which is liberated is methanol. Therefore, suitable means should be provided for eliminating the methanol or other lower alcohol liberated during the reaction period. In general, heat is applied to the reaction mixture and the lower alcohol liberated is either vented to the atmosphere or collected in a condenser system. Since the lower dialkyl esters of terephthalic acid have a tendency to sublime when heated too rapidly, it is desirable to provide means for condensing this sublimate while still allowing the lower alcohols to escape from the system. This may be accomplished by operating a condenser over the reaction vessel at a temperature suitable to condensate the sublimate while allowing the lower alcohol vapors to escape.

Since alcoholysis reactions are rather slow when carried out without catalysts, preferably alcoholysis catalysts are used in preparing the polyester. Among such alcoholysis catalysts are included, for example, lead oxide, lead acetate, zinc oxide, cadmium acetate, cuprous acetate, zinc acetate, magnesium acetate, beryllium acetate, stannic acetate, ferric acetate, nickel acetate, etc. The amount of catalyst employed is not critical and can vary over a wide range, depending upon the particular polyester system under consideration. In general, there is employed from about 0.01 to about 5 percent, by weight, of the alcoholysis catalyst, based on the total weight of the dibasic acid compounds. Higher concentrations of such catalysts may be employed, but no advantage is gained by such use. Preferably, there is employed about 0.1 percent, by weight, of the metallic compound of the catalyst, based upon the total weight of the dibasic acid employed.

In preparing the polyester resins employed, it is desirable to heat the reactants in such a manner that the molecular weight of the polyester can be controlled. This is desirable in that the polyester must form a homogeneous solution with the siloxanol or silicone solution in order to form the desired copolymer resin. The reaction is accomplished by heating the reactants and alcoholysis catalyst from room temperature to a temperature of approximately 100° C., at which time the reactants are dissolved. The dissolved reactants are then heated with agitation and sparged with nitrogen gas to a temperature of 160° C. with a maximum allowable temperature of about 200° C. The reaction is stopped when the desired room temperature viscosity of 38,000 to 42,000 centistokes measured at 25° C. is achieved. An indication of this point is the amount of alcohol carried out of the system. For the desired viscosity of 38,000 to 42,000 centipoises, the alcohol so passed from the system should range from about 67.5 percent to about 68.5 percent, by weight, of the alcohol theoretically obtainable.

According to the above application, the copolymerization of the hydrolyzed silane and polyester intermediates is carried out by charging the intermediates in desired proportions to a vessel having an agitator, thermometer, condenser, receiver, cold trap, and an adjustable vacuum source. With the ingredients of the vessel, the system pressure is reduced to from about 600 mm. to 400 mm. of mercury absolute, and preferably 500 mm. of mercury. With stirring, heat is applied to flash off the solvent such as butanol and butyl acetate at a reasonably low temperature, leaving the polyester and silicone constituents at a relatively high solids content. When a temperature of 135° C. is reached after about 30 minutes, the system pressure is lowered over a period of about 30 minutes to 100 mm. of mercury absolute, and at the same time the temperature is raised to 175° C. to 180° C. The reactants are copolymerized at this temperature range until a sample of the copolymer placed upon a cure plate at 200° C. had a gel time of 30 seconds. Methanol and water formed are flashed out of the system. The reaction mixture is then cooled quickly by adding a suitable solvent to a solids content of about 65 percent, by weight, and a viscosity of about 200 to 350 centipoises at 25° C. Finally, the resin is filtered.

It has been found that for final copolymer products, prepared according to the above method and to produce such copolymer products of desired physical characteristics, the polyester should preferably have a viscosity of from about 38,000 to 42,000 centipoises, measured as above. It was found that polyesters having a viscosity of less than 38,000 centipoises produced copolymers which tended to be soft and slow curing and of poor mar resistance, although where such qualities could be sacrificed to a degree, polyesters of lower viscosity than 38,000 centipoises were useful. It was further found that polyesters of over 42,000 centipoises viscosity did not copolymerize readily or cocondense with the silicone intermediate and tended to produce two-phased final products.

It will be seen, then, that according to the above application, the viscosity of the polyester material must be closely controlled within relatively narrow limits. Such control can be achieved by using necessary precautions, but in a production process it is desirable that materials having a wider range of viscosity be capable of utilization.

It is therefore a principal object of my invention to provide silicone-polyester compositions of the same general type as described above, except that polyester compositions having a wide range of viscosity can be used, thus facilitating the commercial exploitation of the process.

According to my invention, there are prepared silicon-polyester compositions of the above general type in which the viscosity of the polyester component can be varied widely. As contrasted to the preceding invention in which the copolymerization is carried out under a vacuum, the present process is carried out with the system open to the atmosphere, permitting the use of polyester resins having viscosities up to about 140,000 centipoises. I have found also that when the system is left open to the atmosphere or a so-called "flash" process in which solvents are quickly expelled is used and the iron or zirconium catalyst as well is employed, polyesters having a viscosity of up to 3,800,000 centipoises or even higher can be advantageously used.

The silicone intermediates in this invention are prepared similarly to those of the above-identified copending application. The following example is illustrative of such preparation.

EXAMPLE 1

There were placed in an ice-cooled vessel equipped with an agitator, a thermometer, and a dropping funnel 650 grams of n-butyl acetate, 72 grams of butanol, and 1010 grams of water. In the dropping funnel there was placed a blend of 149 grams methyltrichlorosilane, 91 grams dimethyldichlorosilane, 81 grams diphenyldichlorosilane, and 179 grams phenyltrichlorosilane. The silane blend was added slowly to the mixture of the vessel with agitation, the temperature being kept below 40° C. After the addition of the silane, the mixture was stirred for about 10 minutes and the acid solution formed during the hydrolysis process allowed to settle and drawn off. The siloxanol solution was then agitated with 300 grams of water and the water layer again drawn off. The remaining solution having a solids content of about 30 percent was then filtered. The viscosity of the solution was less than 20 centipoises, measured with a Brookfield viscosimeter at 25° C.

The following example is illustrative of the polyesters used in connection with this invention, the general procedure being similar to that used in the above-identified application except that polyesters of different or higher viscosities were prepared.

EXAMPLE 2

A polyester resin was prepared from the following ingredients: dimethylisophthalate [1]—1823 grams, glycerine—885 grams and ethylene glycol—356 grams.

The above ingredients were added along with 0.785 gram lead acetate to a three-necked flask equipped with a packed column, condenser, receiver, nitrogen sparge, and a thermometer and agitator. The contents were heated to 100° C. to 120° C. to melt the dimethylisophthalate, the reactants forming a two-phase system at this point. A nitrogen sparge was used and, with continued heating at about 160° C., an ester interchange reaction began, the methyl groups of the dimethylisophthalate being displaced by the polyhydric alcohol, forming methanol and a complex polyester. The methanol was carried through the column and out of the system by the nitrogen sparge. After 404 grams of methyl alcohol had been collected, the reaction was stopped by cooling rapidly to room temperature. The final polyester had a viscosity of 133,000 centipoises at 25° C.

The following example will illustrate the copolymerization of hydrolyzed silanes with polyesters by the "flash" process, or the process wherein the reacting system is left open to the atmosphere and solvent is quickly expelled as opposed to maintaining it under a vacuum during the reaction.

EXAMPLE 3

There were heated together 1000 grams of hydrolyzed silanes or silicone of Example 1, 106 grams of the polyester of Example 2, having a viscosity of 133,000 centipoises, at a temperature of 70° C. with agitation to produce a clear solution. The silicone content was 75 percent and the polyester content 25 percent by weight. This material, in the amount of 954 grams, was added to an addition funnel mounted on a vessel having also an agitator, thermometer, condenser and receiver. The silicone polyester material was added to the heated reaction vessel at such a rate that the reaction mixture temperature was maintained at 200° C. This took about 35 minutes. This procedure permitted fast or rapid flashing of the solvent, leaving the resin solids intimately mixed at 200° C. The temperature was held at 200° C. until in about 45 minutes the copolymer had a gel time of 30 seconds on a 200° C. cure plate. The temperature of flashing and reaction is not critical, being variable from 150° C. to 250° C. However, I prefer that the addition take place at 180° C. to 190° C. and the reaction at 190° C. to 190°C. The copolymer was then cooled by adding 215 grams of a 70 percent, by weight, xylene—30 percent, by weight, n-butanol mixture. The sparkling clear finished copolymer or resin had a 25° C. viscosity of about 200 centipoises. This clear copolymer is contrasted to a cloudy two-phase reacted mixture obtained when using the vacuum process described above and pertinent to the above copending application. It is particularly useful with polyesters having a viscosity of over about 42,000 centipoises.

Additional experiments carried out using the silicones and polyesters of the type described herein show that, using the flash technique alone, clear homogeneous silicone-polyesters are prepared with polyesters having a viscosity up to about 140,000 centipoises.

While I do not wish to be bound by any theory regarding the success of my flash technique (it being sufficient that it actually works), I believe that it is attributable to the fact that conditions are more suitable to cocondensation rather than to cyclization of the polyester. Cyclization of molecules generally proceeds best in dilute solution. Therefore, when the flash technique is used, quickly evaporating the ester solvent, highly concentrated hot polymers, easily susceptible to cocondensation, remain. When the solvent is removed, relatively slowly as in the vacuum process under reduced pressure, cyclization in the relatively dilute solution is permitted to occur.

It will be seen that by using the flash technique in preparing silicone polyester copolymers, the permissible range of polyester viscosities is increased over threefold, from about 38,000 to 42,000 centipoises to 140,000 centipoises. Of course, the flash method can be used at viscosities less than 38,000 to 42,000 centipoises as well. Additionally, the process is simpler being carried out under atmospheric conditions and is shorter by about one-third than the vacuum process because the solvent is quickly flashed off.

The resin of Example 3 was compounded into an enamel by mixing a mill base of 193 grams of the resin with 100 grams of titanium dioxide, ball milling, and then cutting the mill base with additional resin to give a pigment-to-resin ratio of about 0.7. The viscosity was adjusted with xylene to a viscosity of from 20 to 25 seconds, #44 cup, when applied by spraying to a thickness of 3 mils on a 4 x 6 inch, 37.5-mil thick, cold-rolled steel panel, air dried for 15 minutes, precured for 15 minutes at 125° C. and cured for one hour at 225° C., the enamel had a gloss of 88 as measured with a 60° Gardner glossmeter, an impact as measured in the Gardner variable impact tester of greater than 30 lb.-in., and

---

[1] Dimethylisophthalate assayed as 78% by weight dimethylisophthalate and 22% dimethylterephthalate.

a pencil hardness as measured with Venus drawing pencils of 2H and good adhesion, as indicated by the smooth slot cut in the enamel by the pencil point. The material is further characterized by excellent heat resistance. It will be understood, of course, that varying properties to suit the needs of individual applications can be attained by varying the amount of silicone and polyester.

I have further found that when my flash process is used in conjunction with an iron, zirconium or tin catalytic agent, polyesters up to about 3,800,000 centipoises viscosity at 25° C. or even higher can be copolymerized with hydrolyzed silane or silicone material to produce clear homogeneous copolymers. The catalyst can be used in any form which makes the metal readily available to the reactants. The various soluble salts or complexes of the metals can be used. From the standpoint of convenience, I prefer to use metallic soaps embodying the metal such as the octoate, palmitate, stearate, etc. The amount of catalytic agent required ranges from about 0.01 percent, by weight, upward, based on the reacting silicone and polyester materials. While more than 0.01 percent of the catalyst can be used, it appears to be of no additional benefit.

The following experiments illustrate the use of the catalyst described herein, along with the flash technique. In each case, the hydrolyzed silane material or silicone was that of Example 1 and the polyester was similar to that of Example 2, except that the viscosity of the polyester was adjusted by varying the amount of methanol allowed to discharge from the system. In carrying out the examples, the following procedure was used. Base solutions of 10 parts, by weight, silicone and 1 part, by weight, polyester were prepared to give a silicone content of 75 percent, by weight (the silicone intermediate is 30 percent, by weight, silicone), and 25 percent, by weight, polyester. To these solutions were added varying amounts of the catalyst. To simulate the flash process on a small scale, from 10 to 12 drops of the solution were poured on a cure plate maintained at 200° C. With stop-watch timing, the sample on the cure plate was continuously stirred and samples removed therefrom every 30 seconds to a clean glass slide. This sampling procedure was repeated every 30 seconds until the remainder of the material on the cure plate gelled. All samples were then examined for clarity and homogeneity.

In Table I below, illustrating the examples using iron catalyst, the notation "C" indicates a sparkling clear homogeneous end product. The notation "H" indicates a hazy or non-homogeneous product.

*Table I*

| Ex. | Percent Fe | Min. at 200° C. | Polyester Viscosity—Centipoises | | | | |
|---|---|---|---|---|---|---|---|
| | | | 71,000 | 195,000 | 540,000 | 1,170,000 | 3,800,000 |
| 4 | 0.01 | ½ | C | C | C | C | C |
| 5 | 0.01 | 1 | C | C | C | C | C |
| 6 | 0.01 | 1½ | C | C | C | C | C |
| 7 | 0.01 | 2 | C | C | C | | |
| 8 | 0.01 | 2½ | C | | | | |
| 9 | 0.01 | 3 | | | | | |
| | | Gel Time | 2'30" | 2'03" | 1'50" | 1'52" | 1'52" |
| 10 | 0.001 | ½ | H | H | H | H | H |
| 11 | 0.001 | 1 | H | H | H | H | H |
| 12 | 0.001 | 1½ | C | H | H | H | H |
| 13 | 0.001 | 2 | C | H | H | H | H |
| 14 | 0.001 | 2½ | C | H | H | | |
| 15 | 0.001 | 3 | | | | | |
| | | Gel Time | 2'30" | 2'18" | 2'30" | 2'20" | 2'12" |

From Table I it will be apparent that the optimum amount of iron catalyst is about 0.01 percent, by weight, of the iron based on the weight of the reacting silicone and polyester. The iron was in the form of the iron octoate sold by Modex as Modex Iron Octoate—6%.

Shown in Table II below are examples similar to those of Table I except that zirconium catalyst in the form of Advance Zirco Drier manufactured by the Advance Solvents and Chemical Corporation and containing 6 percent zirconium was used.

*Table II*

| Ex. | Percent Zr | Min. at 200° C. | Polyester Viscosity in Centipoises | | | |
|---|---|---|---|---|---|---|
| | | | 71,000 | 195,000 | 1,170,000 | 3,800,000 |
| 16 | 0.01 | 1 | H | H | H | |
| 17 | 0.01 | 2 | H | H | H | |
| 18 | 0.01 | 3 | H | H | H | |
| 19 | 0.01 | 4 | C | H | H | |
| 20 | 0.01 | 5 | C | C | H | |
| 21 | 0.01 | 6 | C | C | H | |
| 22 | 0.01 | 7 | C | C | | |
| 23 | 0.01 | 8 | | C | | |
| | | Gel Time | 7'20" | 8'03" | 6'18" | |
| 24 | 0.001 | 1 | H | H | H | H |
| 25 | 0.001 | 2 | H | H | H | H |
| 26 | 0.001 | 3 | C | H | H | H |
| 27 | 0.001 | 4 | C | H | H | H |
| 28 | 0.001 | 5 | C | C | H | H |
| 29 | 0.001 | 6 | C | C | C | H |
| 30 | 0.001 | 7 | | | | C |
| | | Gel Time | 6'36" | 6'21" | 6'50" | 7'45" |

From Table II it will again be noted that the minimum amount of zirconium required is about 0.01 percent, by weight, based on the weight of the reacting polymers. The zirconium was in the form of a zirconium metal complex in mineral spirits containing 6 percent zirconium and sold by Advance Solvents and Chemical Corporation as Advance Zirco Drier.

It has also been found that tin is an effective catalytic agent for preparing the present materials using polyesters of high viscosity.

EXAMPLE 30

When 10 parts by weight of the hydrolyzed silanes of Example 1 were heated with 1 part by weight of the polyester of Example 2 having a viscosity of 50,500 centipoises and the copolymerization was carried out as in Example 3 using as the catalyst 0.01 percent tin in the form of the octoate, the resultant product was crystal clear.

The following examples will further illustrate the use of the catalytic agents of my invention.

EXAMPLE 31

There were mixed together 1000 grams of the silicone of Example 1 and 106 grams of the polyester of Example 2 having a viscosity of 133,000 centipoises along with about 0.01 percent, by weight, zirconium in the form of the above-mentioned Advance Zirco Drier. The mixture was heated to 80° C. at which point it became miscible. This material was added as in Example 3 through an addition funnel to a vessel equipped with an agitator, thermometer, addition funnel and receiver. Addition of the mixture was at such a rate that again the temperature remained at about 200° F. When all of the mixture had been added, the material was bodied at 180° C. to a gel time of 30 seconds on a 200° C. cure plate and then cut with 170 grams of a mixture of 70 percent, by weight, xylene and 30 percent, by weight, butanol. The sparkling clear homogeneous product had a viscosity of about 200 centipoises. Enamels made as described above with this resin had properties similar to those obtained with the product of Example 3.

EXAMPLE 32

Example 31 was repeated except that the polyester had a viscosity of 105,000 centipoises. Again, the resultant copolymer was clear and homogeneous.

EXAMPLE 33

Example 31 was repeated using a polyester having a viscosity of 111,000 centipoises with a resultant clear, homogeneous copolymer.

Example 3 was repeated using various weight proportions of the silicone material set forth in Example 1 above. The polyester resin used was prepared according to the procedure of Example 2 above, except that the ingredients were used in the proportion of 338 grams of dimethylisophthalate, 163 grams glycerin (99%), and 97 grams ethylene glycol, the dimethylisophthalate being assayed as 78% by weight dimethylisophthalate, and 22% dimethylterephthalate. The polyester resin as used had a viscosity at 25° C. of 58,600 centipoises.

The silicone material and polyester material were combined as described in Example 3 above and enamels were compounded therefrom and tested as described above, except that the sprayed enamel was pre-cured for 15 minutes at 150° C. instead of for 15 minutes at 125° C. The proportions of silicone material and polyester and the results obtained with various cures and heat aging after pre-cure are set forth in Table III below:

*Table III*

| Ex. | Percent silicone | Cure 1 hr. at 225° C. | | | Mar Resistance | Gloss | Heat Age 45½ hours at 250° C | | |
|---|---|---|---|---|---|---|---|---|---|
| | | 60° Gloss | Impact (lb.-in.) | Hardness | | | Impact (lb.-in.) | Hardness | Mar Resistance |
| 34 | 60 | 23 | 6 | 3H | Good | 14 | 2 | 3H | Poor. |
| 35 | 70 | 44 | 18 | 3H | Fair | 11 | 2 | 3H | Fair. |
| 36 | 75 | 70 | 24 | 3H | Fair | 50 | 2 | 3H | Good. |
| 37 | 85 | 40 | 16 | H | Fair | 12 | 2 | 3H | Good. |
| 38 | 95 | 52 | 16 | F | Poor | 16 | 2 | 3H | Fair. |

From the above table, it will be apparent that materials containing from 70 to 95% silicone produce superior cured compositions. All had good adhesion.

It has further been found that when materials containing at least about 75% silicone are compounded as described above, further amounts of silicone may be simply cold-blended or mechanically mixed with the silicone-polyester composition to produce materials which are substantially equivalent in their characteristics to those materials in which all of the silicone has been heat reacted with the polyester material. By this procedure, stock silicone-polyester compositions may be prepared and further quantities of silicone cold-blended therewith in amounts as required to meet any particular requirements. For example, there was cold-blended with the silicone-polyester composition of Example 36 further silicone material of the same composition to bring the total silicone content to about 85% by weight. When an enamel was prepared from this composition as described above and cured for one hour at 225° C., it had a gloss value of 73 and impact value of 6 lb.-inch, a pencil hardness of 3H, good mar resistance and good adhesion. After heat aging for 45½ hours at 250° C., the gloss value was 65, the impact value 1 lb.-inch, the hardness 3H and the mar resistance was good.

The silicone-polyester composition of Example 36 was further altered to an 85% silicone content by cold-blending therewith a silicone material prepared as in Example 1, except that 149.5 grams methyltrichlorosilane, 423 grams phenyltrichlorosilane, 129 grams dimethyldichlorosilane and 253 grams diphenyldichlorosilane were used as basic ingredients. When enamels were prepared as described above from this 85% silicone composition as described above and the enamel cured for one hour at 225° C., the gloss value was 70, the impact was 3 lb.-inch, the hardness 3H, the mar resistance was good and the adhesion good. After heat aging for 45½ hours at 250° C., the gloss rating was 57, the impact value was 0, the hardness was 3H, and the mar resistance and adhesion were good.

By this invention there are provided homogeneous copolymers of hydrolyzed silanes or silicones and polyesters of the type described, wherein the polyester utilized can have viscosities of over 42,000 centipoises and up to 3,800,000 or more centipoises at 25° C. It will be understood, of course, that polyesters of lesser viscosity can also be used. It will also be seen that the compositions containing from about 70% to 95% by weight of silicone material are superior in their physical characteristics. It has been shown also that when a base composition containing at least about 75% by weight, silicone has been prepared, further quantities of silicone may be cold-blended with the base silicone-polyester composition, as opposed to heat reacting, to produce compositions which are essentially equivalent to those which are heat reacted. The copolymers produced are useful in preparing high-temperature resisting enamels and enamels having good gloss, hardness, and resistance to physical abuse. Used in solutions in well-known solvents, they are useful for coating structures to provide thereon electrically insulating coatings, having again good high-temperature resistance, hardness, mar and impact resistance, superior gloss and good adhesion.

What I claim as new and desire to secure by Letters Patent is:

1. The process of making a homogeneous silicone-polyester copolymer composition which comprises heating at a temperature in the range of from 150° C. to 250° C. under atmospheric conditions, a reaction mixture of (1) an aliphatic ester and alcohol-containing solution of the hydrolysis product of a mixture of organochlorosilanes having from about 1 to 1.75 organic groups per silicon atom selected from the class consisting of lower alkyl groups, aryl groups, halogenated aryl groups and mixtures thereof, and (2) a polyester material comprising the reaction product of (a) from 25 to 60 equivalent percent of a lower dialkyl ester of a member selected from the group consisting of isophthalic acid, terephthalic acid and mixtures thereof, (b) from 10 to 50 equivalent percent of ethylene glycol and (c) from 20 to 60 equivalent percent of a saturated aliphatic polyhydric alcohol having at least three hydroxyl groups, where said polyester of (2) has a viscosity of greater than about 58,000 centipoises at 25° C., and wherein said reaction mixture, said hydrolysis product of (1) is present at about 70 to 95 percent by weight and said polyester of (2) is present at about 30 to 5 percent by weight, based on the weight of said hydrolysis product of (1) and said polyester of (2).

2. The process of making a homogeneous silicone-polyester copolymer composition which comprises heating at a temperature in the range of from 150° C. to 250° C. under atmospheric conditions, in the presence of catalytic amounts of a member selected from the class consisting of iron, zirconium, tin and mixtures thereof, a reaction mixture of (1) an aliphatic ester and alcohol-containing solution of the hydrolysis product of a mixture of organochlorosilanes having from about 1 to 1.75 organic groups per silicon atom selected from the class consisting of lower alkyl groups, aryl groups, halogenated aryl groups and mixtures thereof, and (2) a polyester material comprising the reaction product of (a) from 25 to 60 equivalent percent of a lower dialkyl ester of a member selected from the group consisting of isophthalic acid, terephthalic acid and mixtures thereof, (b) from 10 to 50 equivalent percent of ethylene glycol and (c) from 20 to 60 equivalent percent of a saturated aliphatic polyhydric alcohol having at least three hydroxyl groups, where said polyester of (2) has a viscosity of greater than about 58,000 centipoises at 25° C. and wherein said reaction mixture, said hydrolysis product of (1) is present at about 70 to 95 percent by weight and said polyester of (2) is present at about 30 to 5 percent by weight, based on the weight of said hydrolysis product of (1) and said polyester of (2).

3. The process of making a homogeneous silicone-polyester copolymer composition which comprises heating at a temperature in the range of from 150° C. to 250° C. under atmospheric conditions, and in the presence of catalytic amounts of iron, a reaction mixture of (1) an aliphatic ester and alcohol-containing solution of the hydrolysis product of a mixture of organochlorosilanes having from about 1 to 1.75 organic groups per silicon atom selected from the class consisting of lower alkyl groups, aryl groups, halogenated aryl groups and mixtures thereof and (2) a polyester material comprising the reaction product of (a) from 25 to 60 equivalent percent of a lower dialkyl ester of a member selected from the group consisting of isophthalic acid, terephthalic acid and mixtures thereof, (b) from 10 to 50 equivalent percent of ethylene glycol, and (c) from 20 to 60 equivalent percent of a saturated aliphatic polyhydric alcohol having at least three hydroxyl groups, where said polyester of (2) has a viscosity of greater than about 58,000 centipoises at 25° C., and wherein said reaction mixture, said hydrolysis product of (1) is present at about 70 to 95 percent by weight and said polyester of (2) is present at about 30 to 5 percent by weight, based on the weight of said hydrolysis product of (1) of said polyester of (2).

4. The process of making a homogeneous silicone-polyester copolymer composition which comprises heating at a temperature in the range of from 150° C. to 250° C. under atmospheric conditions, in the presence of catalytic amounts of zirconium, a reaction mixture of (1) an aliphatic ester and alcohol-containing solution of the hydrolysis product of a mixture of organochlorosilanes having from about 1 to 1.75 organic groups per silicon atom selected from the class consisting of lower alkyl groups, aryl groups, halogenated aryl groups and mixtures thereof and (2) a polyester material comprising the reaction product of (a) from 25 to 60 equivalent percent of a lower dialkyl ester of a member selected from the group consisting of isophthalic acid, terephthalic acid and mixtures thereof, (b) from 10 to 50 equivalent percent of ethylene glycol, and (c) from 20 to 60 equivalent percent of a saturated aliphatic polyhydric alcohol having at least three hydroxyl groups, where said polyester of (2) has a viscosity of greater than about 58,000 centipoises at 25° C., and wherein said reaction mixture, said hydrolysis product of (1) is present at 70 to 95 percent by weight and said polyester of (2) is present at from 30 to 5 percent by weight, based on the weight of said hydrolysis product and said polyester.

5. The process of making a homogeneous silicone-polyester copolymer composition which comprises heating at a temperature in the range of from 150° C. to 250° C. under atmospheric conditions in the presence of catalytic amounts of tin, a reaction mixture of (1) an aliphatic ester and alcohol-containing solution of the hydrolysis product of a mixture of organochlorosilanes having from about 1 to 1.75 organic groups per silicon atom selected from the class consisting of lower alkyl groups, aryl groups, halogenated aryl groups and mixtures thereof, and (2) a polyester material comprising the reaction product of (a) from 25 to 60 equivalent percent of a lower dialkyl ester of a member selected from the group consisting of isophthalic acid, terephthalic acid and mixtures thereof, (b) from 10 to 50 equivalent percent of ethylene glycol, and (c) from 20 to 60 equivalent percent of a saturated aliphatic polyhydric alcohol having at least three hydroxyl groups, where said polyester of (2) has a viscosity of greater than 58,000 centipoises at 25° C., and wherein said reaction mixture, said hydrolysis product of (1) is present at about 70 to 95 percent by weight and said polyester of (2) is present at about 30 to 5 percent by weight, based on the weight of said hydrolysis product of (1) and said polyester of (2).

6. The process of making a homogeneous silicone-polyester copolymer composition which comprises heating at a temperature in the range of from 150° C. to 250° C. under atmospheric conditions in the presence of catalytic amounts of a member selected from the group consisting of iron, zirconium, tin and mixtures thereof, a reaction mixture of (1) an aliphatic ester and alcohol-containing solution of the hydrolysis product of a mixture of organochlorosilanes having from about 1 to 1.75 organic groups per silicon atom selected from the class consisting of lower alkyl groups, aryl groups, halogenated aryl groups and mixtures thereof, and (2) a polyester material comprising the reaction product of (a) from 25 to 53 equivalent percent of a lower dialkyl ester of a member selected from the group consisting of isophthalic acid, terephthalic acid and mixtures thereof, (b) from 15 to 42 equivalent percent of ethylene glycol, and (c) from 28 to 50 equivalent percent of a saturated aliphatic polyhydric alcohol having at least three hydroxyl groups, where said polyester of (2) has a viscosity of greater than about 58,000 centipoises at 25° C., and wherein said reaction mixture, said hydrolysis product of (1) is present at about 70 to 95 percent by weight and said polyester of (2) is present at about 30 to 5 percent by weight based on the weight of said hydrolysis product of (1) and said polyester of (2).

7. The process of making a homogeneous silicone-polyester copolymer composition which comprises heating at a temperature in the range of from 150° C. to 250° C. under atmospheric conditions in the presence of catalytic amounts of iron, a reaction mixture of (1) an aliphatic ester and alcohol-containing solution of the hydrolysis product of a mixture of organochlorosilanes having from about 1 to 1.75 organic groups per silicon atom selected from the class consisting of lower alkyl groups, aryl groups, halogenated aryl groups and mixtures thereof, and (2) a polyester material comprising the reaction product of (a) from 25 to 53 equivalent percent of a lower dialkyl ester of a member selected from the groups consisting of isophthalic acid, terephthalic acid and mixtures thereof, (b) from 15 to 42 equivalent percent of ethylene glycol, and (c) from 28 to 50 equivalent percent of a saturated aliphatic polyhydric alcohol having at least three hydroxyl groups, where said polyester of (2) has a viscosity of greater than about 58,000 centipoises at 25° C., and wherein said reaction mixture, said hydrolysis product of (1) is present at about 70 to 95 percent by weight and said polyester of (2) is present at about 30 to 5 percent by weight based on the weight of said hydrolysis product of (1) and said polyester of (2).

8. The process of making a homogeneous silicone-polyester copolymer composition which comprises heating at a temperature in the range of 150° C. to 250° C. under atmospheric conditions in the presence of catalytic amounts of zirconium, a reaction mixture of (1) an aliphatic ester and alcohol-containing solution of the hydrolysis product of a mixture of organochlorosilanes having from about 1 to 1.75 organic groups per silicon atom selected from the class consisting of lower alkyl groups, aryl groups, halogenated aryl groups and mixtures thereof, and (2) a polyester material comprising the reaction product of (a) from 25 to 53 equivalent percent of a lower dialkyl ester of a member selected from the group consisting of isophthalic acid, terephthalic acid and mixtures thereof, (b) from 15 to 42 equivalent percent of ethylene glycol, and (c) from 28 to 50 equivalent percent of a saturated aliphatic polyhydric alcohol having at least three hydroxyl groups, where said polyester of (2) has a viscosity of greater than about 58,000 centipoises at 25° C., and wherein said reaction mixture, said hydrolysis product of (1) is present at about 70 to 95 percent by weight and said polyester of (2) is present at about 30 to 5 percent by weight based on the weight of said hydrolysis product of (1) and said polyester of (2).

9. The process of making a homogeneous silicone-polyester copolymer composition which comprises heating at a temperature in the range of from 150° C. to 250° C. under atmospheric conditions in the presence of a catalytic amount of tin, a reaction mixture of (1) an aliphatic ester and alcohol-containing solution of a hydrolysis product of a mixture of organochlorosilanes having from about 1 to 1.75 organic groups per silicon atom selected from the class consisting of lower alkyl groups, aryl groups, halogenated aryl groups and mixtures thereof, and (2) a polyester material comprising the reaction product of (a) from 25 to 53 equivalent percent of a lower dialkyl ester of a member selected from the group consisting of isophthalic acid, terephthalic acid and mixtures thereof, (b) from 15 to 42 equivalent percent of ethylene glycol, and (c) from 28 to 50 equivalent percent of a saturated aliphatic polyhydric alcohol having at least three hydroxyl groups, where said polyester of (2) has a viscosity greater than about 58,000 centipoises at 25° C., and wherein said reaction mixture, said hydrolysis product of (1) is present at about 70 to 95 percent by weight and said polyester of (2) is present at about 30 to 5 percent by weight based on the weight of said hydrolysis product of (1) and said polyester of (2).

10. The product resulting from the process of claim 1.
11. The product resulting from the process of claim 2.
12. The product resulting from the process of claim 3.
13. The product resulting from the process of claim 4.
14. The product resulting from the process of claim 5.
15. The product resulting from the process of claim 6.

16. The process of making a silicone-polyester composition which comprises mechanically adding the hydrolysis product of a mixture or organochlorosilanes containing from about 1 to 1.75 organic groups per silicon atom selected from the class consisting of lower alkyl groups, aryl groups, halogenated aryl groups and mixtures thereof to a homogeneous silicone-polyester copolymer composition formed by heating at a temperature in the range of 150° C. to 250° C. under atmospheric conditions, a reaction mixture of (1) an aliphatic ester and alcohol-containing solution of the hydrolysis product of a mixture of organochlorosilanes having from about 1 to 1.75 organic groups per silicon atom selected from the class consisting of lower alkyl groups, aryl groups, halogenated aryl groups, and mixtures thereof and (2) a polyester material having a viscosity greater than about 58,000 centipoises at 25° C. comprising the reaction product of (a) from 25 to 60 equivalent percent of a lower dialkyl ester and a member selected from the group consisting of isophthalic acid, terephthalic acid and mixtures thereof, (b) from 10 to 50 equivalent percent of ethylene glycol, and (c) from 20 to 60 equivalent percent of a saturated aliphatic polyhydric alcohol having at least 3 hydroxyl groups, wherein said reaction mixture, said hydrolysis product of (1) is present at 75 to 95 percent by weight and said polyester of (2) is present at from 25 to 5 percent based on the weight of said hydrolysis product of (1) and said polyester of (2).

17. The product produced by the process of claim 16.

References Cited in the file of this patent
UNITED STATES PATENTS

| | | |
|---|---|---|
| 2,607,755 | Bunnell | Aug. 19, 1952 |
| 2,663,694 | Millar | Dec. 22, 1953 |
| 2,721,854 | Kohl | Oct. 25, 1955 |
| 2,768,149 | Millar | Oct. 23, 1956 |
| 2,821,518 | Edelman et al. | Jan. 28, 1958 |
| 2,843,555 | Berridge | July 15, 1958 |
| 2,877,202 | Olson | Mar. 10, 1959 |